(12) United States Patent
Leppänen et al.

(10) Patent No.: US 11,416,201 B2
(45) Date of Patent: Aug. 16, 2022

(54) APPARATUS AND ASSOCIATED METHODS FOR COMMUNICATION BETWEEN USERS EXPERIENCING VIRTUAL REALITY

(71) Applicant: Nokia Technologies Oy, Espoo (FI)

(72) Inventors: Jussi Leppänen, Tampere (FI); Arto Lehtiniemi, Lempaala (FI); Juha Arrasvuori, Tampere (FI); Jukka Holm, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 77 days.

(21) Appl. No.: 16/765,079

(22) PCT Filed: Nov. 23, 2018

(86) PCT No.: PCT/EP2018/082307
§ 371 (c)(1),
(2) Date: May 18, 2020

(87) PCT Pub. No.: WO2019/101895
PCT Pub. Date: May 31, 2019

(65) Prior Publication Data
US 2020/0371737 A1 Nov. 26, 2020

(30) Foreign Application Priority Data
Nov. 27, 2017 (EP) ..................................... 17203682

(51) Int. Cl.
*G06F 3/16* (2006.01)
*G06F 3/14* (2006.01)
(Continued)

(52) U.S. Cl.
CPC ............ *G06F 3/1454* (2013.01); *G06F 3/011* (2013.01); *H04L 63/102* (2013.01)

(58) Field of Classification Search
CPC ............... G06T 19/006; G06T 2200/24; G06T 2215/16; G06T 19/20; G06T 15/08;
(Continued)

(56) References Cited

U.S. PATENT DOCUMENTS 9,225,934 B2 * 12/2015 Cho ...................... G02B 27/017
10,325,407 B2 * 6/2019 Lanier ..................... G06F 3/011
(Continued)

FOREIGN PATENT DOCUMENTS

| EP | 2325798 A2 | 5/2011 |
|----|-----------|--------|
| EP | 3196838 A1 | 7/2017 |
| EP | 3211629 A1 | 8/2017 |

OTHER PUBLICATIONS

Oral Proceedings received for corresponding European Patent Application No. 17203682.4, dated Jan. 12, 2021, 10 pages.
(Continued)

*Primary Examiner* — Duc Q Dinh
(74) *Attorney, Agent, or Firm* — Alston & Bird LLP

(57) ABSTRACT

An apparatus configured, based on a first virtual space in which visual imagery is presented to a first user and a second, different, virtual space in which visual imagery is presented to a second user, the first and second virtual spaces based on respective virtual reality content that comprises visual imagery and wherein a representation of the first user, viewable by the second user, is provided in the second virtual space and based on a communication initiation input from the second user; to provide for communication and presentation in the second virtual space, at a virtual location based on a location of the second representation of the first user, of a context-volume comprising a sub-volume of the first virtual space at least partly surrounding the first user to enable the second user to seethe first virtual space currently experienced by the first user.

20 Claims, 8 Drawing Sheets

(51) Int. Cl.
*G06F 3/01* (2006.01)
*H04L 9/40* (2022.01)

(58) Field of Classification Search
CPC ........... G06T 15/10; G06T 7/55; G06T 19/00; G06T 7/70; G06T 5/20; G06T 11/00; G06F 3/011; G06F 16/29; G06F 3/012; G06F 1/163; G06Q 50/01; H04L 63/102; H04L 67/22; H04L 29/04; G06V 20/20; G06V 10/40; G06V 40/28; G06V 10/235; G09G 2340/12; G09G 2340/125; G09G 2340/0464; G09G 2354/00; H04N 7/147; H04N 7/157; H04N 13/344; H04N 13/279; H04N 13/117; H04N 21/4316; H04N 13/368; H04N 13/383; H04N 13/332; H04N 7/15; H04M 1/724; H04M 1/0264; H04M 1/6066; H04M 3/567; H04M 2203/1025; H04W 88/02; H04W 4/21; G02B 27/017; G02B 27/00
USPC ............................................. 345/7–9
See application file for complete search history.

(56) References Cited

U.S. PATENT DOCUMENTS

| | | | |
|---|---|---|---|
| 10,931,941 | B2 * | 2/2021 | Valdivia ................. G06F 3/167 |
| 2006/0075055 | A1 | 4/2006 | Littlefield |
| 2010/0241998 | A1 | 9/2010 | Latta et al. |
| 2014/0043211 | A1 * | 2/2014 | Park ....................... G02B 27/01 345/8 |
| 2014/0047027 | A1 | 2/2014 | Moyers |
| 2014/0058807 | A1 | 2/2014 | Altberg et al. |
| 2016/0180449 | A1 | 6/2016 | Naware et al. |
| 2017/0068508 | A1 | 3/2017 | Cricri et al. |
| 2017/0193704 | A1 * | 7/2017 | Leppanen ........... G06F 3/04815 |
| 2018/0005429 | A1 * | 1/2018 | Osman .................... G06T 15/20 |
| 2018/0061127 | A1 * | 3/2018 | Gullicksen ........... G06F 3/0383 |

OTHER PUBLICATIONS

Office action received for corresponding Indian Patent Application No. 202047025313, dated Jul. 6, 2021, 6 pages.

"Sony's 'Joshua Bell VR Experience' on PSVR is Among the Best VR Video You'll Find on Any Headset", RoadTovr, Retrieved on Apr. 1, 2020, Webpage available at: https://www.roadtovr.com/now-psvr-sonys-joshua-bell-vr-experience-among-best-vr-video-youll-find-headset/.

Shah et al., "Metrics For Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2, 1998, pp. 107-133.

Smith, "Towards a logic of innovation", The International Handbook on Innovation, Dec. 2003. p. 347-365.

Extended European Search Report received for corresponding European Patent Application No. 17203682.4, dated Jan. 12, 2018, 6 pages.

International Search Report and Written Opinion received for corresponding Patent Cooperation Treaty Application No. PCT/EP2018/082307, dated Mar. 20, 2019,13 pages.

Office action received for corresponding European Patent Application No. 17203682.4, dated Jan. 16, 2020, 6 pages.

Decision to Refuse for European Application No. 17203682.4 dated Jan. 5, 2022, 13 pages.

Minutes of the Oral Proceedings for European Application No. 17203682.4 dated Jan. 4, 2022, 4 pages.

* cited by examiner

901 — based on a first virtual space in which visual imagery is provided for presentation to a first user and a second, different, virtual space in which visual imagery is provided for presentation to a second user, the first and second virtual spaces based on respective first and second virtual reality content that comprises visual imagery displayed in said respective first and second virtual spaces and wherein a representation of the first user is provided in the second virtual space and based on a communication initiation input;

902 — providing for presentation, in the second virtual space, at a virtual location based on a location of the representation of the first user in the second virtual space, of a context-volume comprising a sub-volume of the first virtual space at least partly surrounding the first user to enable the second user to see the first virtual space currently provided for consumption by the first user, and provide for at least communication from the second user to the first user.

Figure 9

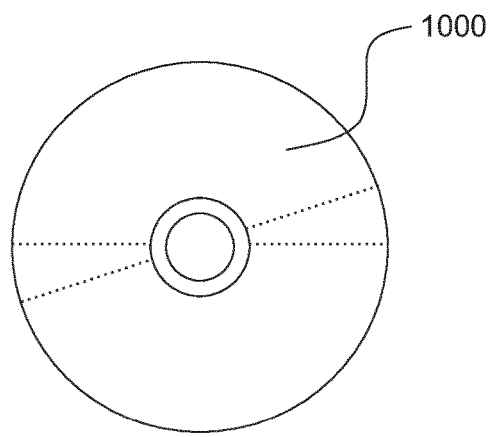

APPARATUS AND ASSOCIATED METHODS FOR COMMUNICATION BETWEEN USERS EXPERIENCING VIRTUAL REALITY

RELATED APPLICATION

This application claims priority to PCT Application No. PCT/EP2018/082307, filed on Nov. 23, 2018, which claims priority to European Application No. 17203682.4, filed on Nov. 27, 2017, each of which is incorporated herein by reference in its entirety.

TECHNICAL FIELD

The present disclosure relates to the field of presentation of virtual, augmented and mixed reality. In particular, it is related to the presentation of a context volume and communication between users in different virtual spaces, associated apparatus, methods and computer programs.

BACKGROUND

The presentation of virtual reality environments is becoming common, with content creators providing more and more content for exploration. The virtual reality experience may be enhanced by communication between users who may be experiencing different virtual reality content and wish to share their experience with others, such as their friends. Providing for an effective communication interface between users who are presented with immersive virtual reality content may be important.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first aspect there is provided an apparatus, the apparatus comprising means configured to;
 based on a first virtual space in which visual imagery is provided for presentation to a first user and a second, different, virtual space in which visual imagery is provided for presentation to a second user, the first and second virtual spaces based on respective first and second virtual reality content that comprises visual imagery displayed in said respective first and second virtual spaces and wherein a representation of the first user is provided in the second virtual space and based on a communication initiation input;
 providing for presentation in the second virtual space, at a virtual location based on a location of the second representation of the first user in the second virtual space, a context-volume comprising a sub-volume of the first virtual space at least partly surrounding the first user to enable the second user to see the first virtual space currently provided for consumption by the first user, and provide for at least communication from the second user to the first user.

In one or more examples, prior to the communication initiation input the presentation of the representation of the first user in the second virtual space is independent of at least visual imagery of the first virtual space. In one or more examples, the first and second virtual spaces comprise three-dimensional virtual spaces.

In one or more examples, at least prior to the communication initiation input, interaction by the second user with the representation of the first user does not provide for communication between the first and second users.

In one or more examples, the at least communication from the second user to the first user comprises one or more of:
 i) audio based communication;
 ii) one-way communication;
 iii) two-way communication;
 iv) audio based, two-way, communication between the first user and the second user;
 v) visualised text based communication;
 vi) voice-to-text converted audio for presentation as text to the first user based on voice input from the first user.

In one or more examples, the first virtual reality content includes audio content for presentation in the first virtual space and wherein the presentation of the context-volume includes presentation of said audio content provided for presentation in the first virtual space to enable the second user to hear the audio presented in the first virtual space.

In one or more examples, the communication initiation input comprises one or more of;
 i) a user input by the second user;
 ii) a user input by the second user following a permission-giving input by the first user indicative of them being contactable;
 iii) a voice command directed in a direction within a threshold of the representation of the first user;
 iv) a user input by the first user.

In one or more examples, the apparatus is further caused to provide for display of second-user-imagery representative of the second user, in the first virtual space for viewing by the first user, the second-user-imagery comprising one or more of:
 i) a representation of the second user, such as a two-dimensional or three-dimensional representation;
 ii) a window displayed in the first virtual space to provide for viewing of a representation of the second user in the second virtual space;
 iii) one of a plurality of virtual-space-graphics, each virtual-space-graphic at least representative of a virtual space in which other users, including the second user, who are connected to the first user are active, wherein user-connection information provides an indication of a predetermined link between the first user and said other users;
 iv) other visual imagery representative of the second user.

In one or more examples, the apparatus is caused to provide for application of a predetermined audio effect to the audio captured of the second user that is provided for presentation to the first user to thereby indicate that said audio originates from a different virtual space to the first virtual space.

In one or more examples, based on first user input directed to the second-user-imagery, provide for replacing presentation of the first virtual space intended for viewing by the first user with presentation of the second virtual space intended for viewing by the first user to enable communication between the first user and the second user in a common virtual space.

In one or more examples, the first user is provided with a first-user location in the second virtual space and wherein the presentation of the second virtual space intended for viewing by the first user comprises providing for presentation of a view of the second virtual space from a point of view of the first-user-location, the first-user-location based on a location of the representation of the first user in the second virtual space.

In one or more examples, the context volume further comprises visual imagery of a physical location in which the first user is present while being presented with said first virtual space based on live-captured camera imagery of the physical location.

In one or more examples, the context volume comprises a core section comprising said sub-volume of the first virtual space that is provided for display to at least partly surround the first user, and an outer layer section, outward of said core section, comprising said visual imagery of the physical, real-world location in which the first user is present.

In one or more examples, the provision of the representation of the first user, intended for viewing by the second user, that is provided in the second virtual space is dependent on user-connection information indicative of a predetermined link between the first user and the second user.

In one or more examples, a first representation of the first user is provided in the first virtual space and said representation of the first user in the second virtual space comprises a second representation of the first user in the second virtual space, wherein the first representation is representative of the first user and their location in the first virtual space while the second representation is representative of the first user and their absence in the second virtual space.

In one or more examples, the sub-volume of the first virtual space comprises visual imagery from within a predetermined distance of a virtual location at which the first user is located in the first virtual space.

In one or more examples, the respective virtual reality content comprises said visual imagery and optionally audio content, such as spatial audio content.

In one or more examples, the communication initiation input comprises a voice based input from the second user, and wherein the apparatus is configured to communicate at least part of said voice based input from the second user to the first user as part of said communication from the second user to the first user.

In one or more examples, based on captured communication content from the second user, the communication content provided as one of (i) part of the communication initiation input from the second user and (ii) subsequent to said communication initiation input;
 provide for said communication from the second user to the first user of said captured communication content subsequent to said presentation of the context-volume and based on a further indication from the second user.

In a further aspect there is provided a method, the method comprising:
 based on a first virtual space in which visual imagery is provided for presentation to a first user and a second, different, virtual space in which visual imagery is provided for presentation to a second user, the first and second virtual spaces based on respective first and second virtual reality content that comprises visual imagery displayed in said respective first and second virtual spaces and wherein a representation of the first user is provided in the second virtual space and based on a communication initiation input;
 providing for presentation in the second virtual space, at a virtual location based on a location of the second representation of the first user in the second virtual space, a context-volume comprising a sub-volume of the first virtual space at least partly surrounding the first user to enable the second user to see the first virtual space currently provided for consumption by the first user, and provide for at least communication from the second user to the first user.

In a further aspect there is provided a computer readable medium comprising computer program code stored thereon, the computer readable medium and computer program code being configured to, when run on at least one processor, perform the method of:
 based on a first virtual space in which visual imagery is provided for presentation to a first user and a second, different, virtual space in which visual imagery is provided for presentation to a second user, the first and second virtual spaces based on respective first and second virtual reality content that comprises visual imagery displayed in said respective first and second virtual spaces and wherein a representation of the first user is provided in the second virtual space and based on a communication initiation input;
 providing for presentation in the second virtual space, at a virtual location based on a location of the second representation of the first user in the second virtual space, a context-volume comprising a sub-volume of the first virtual space at least partly surrounding the first user to enable the second user to see the first virtual space currently provided for consumption by the first user, and provide for at least communication from the second user to the first user.

In a further example aspect there is provided an apparatus comprising:
 at least one processor; and
 at least one memory including computer program code,
 the at least one memory and the computer program code configured to, with the at least one processor, cause the apparatus to perform at least the following:
 based on a first virtual space in which visual imagery is provided for presentation to a first user and a second, different, virtual space in which visual imagery is provided for presentation to a second user, the first and second virtual spaces based on respective first and second virtual reality content that comprises visual imagery displayed in said respective first and second virtual spaces and wherein a representation of the first user is provided in the second virtual space and based on a communication initiation input;
 provide for presentation, in the second virtual space, at a virtual location based on a location of the representation of the first user in the second virtual space, of a context-volume comprising a sub-volume of the first virtual space at least partly surrounding the first user to enable the second user to see the first virtual space currently provided for consumption by the first user, and provide for at least communication from the second user to the first user.

The present disclosure includes one or more corresponding aspects, examples or features in isolation or in various combinations whether or not specifically stated (including claimed) in that combination or in isolation. Corresponding means and corresponding functional units (e.g., function enabler, ARNR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 9 shows a flowchart illustrating an example method; and

FIG. 10 shows a computer readable medium.

DESCRIPTION OF EXAMPLE ASPECTS

Figure 1:
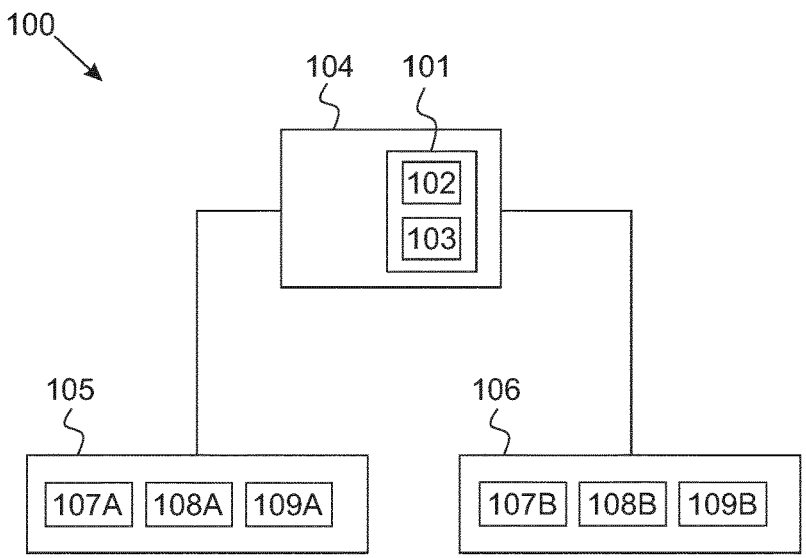
FIG. 1 illustrates an example apparatus for providing for presentation of context volume and communication between users.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real-world scene to simulate the user being physically present at a real-world location or the virtual reality scene may be computer generated or a combination of computer generated and real-world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones configured to capture the surrounding visual and aural scene from a capture point of view. In some examples, the VR content capture device comprises multiple, physically separate cameras and/or microphones. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present.

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world.

The virtual reality content may comprise, and a VR apparatus presenting said VR content may provide, pre-defined-viewing-location VR or free-viewing-location VR. In predefined-viewing-location VR, the location of the user in the virtual reality space may be fixed or follow a pre-defined path. Accordingly, a user may be free to change their viewing direction with respect to the virtual reality imagery provided for display around them in the virtual reality space, but they may not be free to arbitrarily change their viewing location in the VR space to explore the VR space. Thus, the user may experience such VR content from a fixed point of view or viewing location (or a limited number of locations based on where the VR content capture devices were located in the scene). In some examples of predefined-viewing-location VR the imagery may be considered to move past them. In predefined-viewing-location VR content captured of the real world, the user may be provided with the point of view of the VR content capture device. Predefined-viewing-location VR content may provide the user with three degrees of freedom in the VR space comprising rotation of the viewing direction around any one of x, y and z axes and may therefore be known as three degrees of freedom VR (3DoF VR).

In free-viewing-location VR, the VR content and VR apparatus presenting said VR content may enable a user to be free to explore the virtual reality space. Thus, the VR apparatus may allow for the user to be provided with a free point of view or viewing location in the virtual reality space along with a free viewing direction. Free-viewing-location VR is also known as six degrees of freedom (6DoF) VR or volumetric VR to those skilled in the art. Thus, in 6DoF VR the user may be free to look in different directions around the VR space by modification of their viewing direction and also free to change their viewing location (their virtual location) in the VR space by translation along any one of orthogonal x, y and z axes. The movement available in a 6DoF virtual reality space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the VR space from a different virtual location, i.e., move along the x, y, and z axes according to their wishes. The translational movements may be referred to as surge (x), sway (y), and heave (z) using the terms derived from ship motions.

Mixed reality comprises a combination of augmented and virtual reality in which a three-dimensional model of the real-world environment is used to enable virtual objects to appear to interact with real-world objects in terms of one or more of their movement and appearance.

One or more examples described herein relate to 6DoF virtual, mixed or augmented reality content in which the user is at least substantially free to move in the virtual space by user-input through physically moving or, for example, via a dedicated user interface (UI).

The virtual space refers to fully or partially artificial environment that may be viewed, which may be three dimensional. The virtual space may mean a combination of a virtual space to be viewed and corresponding sound space. In some examples, the virtual space may extend horizontally up to 360 degrees and may extend vertically up to 180 degrees. The sound space refers to an arrangement of sound sources in a three-dimensional space. A sound space may be defined in relation to recording sounds (a recorded sound space) and in relation to rendering sounds (a rendered sound space).

Spatial audio comprises audio presented in such a way to a user that it is perceived to originate from a particular location, as if the source of the audio was located at that particular location. Thus, virtual reality content may be provided with spatial audio having directional properties, such that the audio is perceived to originate from a point in the VR space, which may be linked to the imagery of the VR content. Augmented or mixed reality content may be provided with spatial audio, such that the spatial audio is perceived as originating from real world objects visible to the user and/or from augmented reality graphics overlaid over the user's view.

Spatial audio may be presented independently of visual virtual reality or visual augmented reality content. Nevertheless, spatial audio, in some examples, may be considered to be augmented reality content because it augments the aural scene perceived by a user. As an example of independent presentation of spatial audio, a user may wear headphones and, as they explore the real world, they may be presented with spatial audio such that the audio appears to originate at particular locations associated with real world objects or locations. For example, a city tour could be provided by a device that tracks the location of the user in the city and presents audio describing points of interest as spatial audio such that the audio is perceived to originate from the point of interest around the user's location. One or more of the embodiments described herein may present spatial audio.

The spatial positioning of the spatial audio may be provided by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio. Spatial audio may use one or more of volume differences, timing differences and pitch differences between audible presentation to each of a user's ears to create the perception that the origin of the audio is at a particular location in space.

The consumption of virtual, mixed or augmented reality content (referred to as virtual-or-augmented reality content herein for brevity) may require the use of a physical real-world space in which the user can move. The movement of the user, as mentioned above, may be used as user-input to control the user's location in a virtual space provided based on the virtual-or-augmented reality content. In particular, for free-viewing-location virtual or augmented reality content the physical space available to the user to look at virtual objects and scenes from different angles may be important for the effective, immersive consumption of such content.

Communication between users in different physical locations may also be facilitated using a virtual, mixed or augmented reality experience. In one or more examples, the sharing of virtual reality experiences and communication between users may be desirable. However, the immersive nature of virtual reality makes providing an effective communication interface difficult. In one or more examples, it may be important for the initiation of the communication between users to be un-obtrusive to the consumption of virtual reality content. In one or more examples, providing an indication the desire to accept the initiation of communication requests from another user may be difficult.

FIG. 1 shows an example system 100 for presentation of a context volume and providing for communication between users. The system 100 includes an example apparatus 101 for presentation of a context volume, as will be explained below.

The apparatus 101 may comprise or be connected to a processor 102 and a memory 103 and may be configured to execute computer program code. The apparatus 101 may have only one processor 102 and one memory 103 but it will be appreciated that other embodiments may utilise more than one processor and/or more than one memory (e.g. same or different processor/memory types). Further, the apparatus 101 may be an Application Specific Integrated Circuit (ASIC).

The processor may be a general purpose processor dedicated to executing/processing information received from other components, such as from the first and second user apparatus 105, 106, in accordance with instructions stored in the form of computer program code in the memory. The output signalling generated by such operations of the processor is provided onwards to further components, such as to the apparatuses 103, 104.

The memory 103 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of a server 104, which is configured to communicate with first user apparatus 105 and second user apparatus 106. The apparatus 101 may provide for the presentation of the context volume by one or both of the first user apparatus 105 and second user apparatus 106. The apparatus 101 may provide for the communication between the first and second user via their first user apparatus 105 and second user apparatus 106.

In one or more examples, the first user apparatus 105 and second user apparatus 106 comprise VR apparatuses that provide for display of virtual reality content comprising at least visual imagery displayed in a three-dimensional virtual space that is viewable by a user using a respective display 107A, 107B which is part of the VR apparatus 105, 106. The presentation device 107A, in this example, may comprise a VR headset.

The VR apparatus 105, 106, or the VR apparatus 105, 106 under the control of the apparatus 101, may provide for aural presentation of audio content associated with virtual reality content using an audio presentation device 108A, 108B, such as headphones 108A, 108B which are part of the apparatus 105, 106.

In one or more examples, one or both of the VR apparatuses 105, 106 includes or is in communication with one or more cameras 109A, 109B configured to capture imagery of the real-world space in which their respective user is present.

In one or more examples, the VR apparatuses 105, 106 may have functionality to generate the virtual space and thereby present VR content, which may be provided from apparatus 101, server 104 or a data store (not shown). Accordingly, the apparatus 101 may be configured to provide signalling to the VR apparatuses 105, 106 to control or augment what they are presenting to their respective user's and provide for communication between the users via the apparatuses 105, 106.

In one or more other examples, the VR apparatuses 105, 106 may only have presentation functionality and may be unable to generate a three-dimensional virtual space for presentation to a user. Accordingly, the apparatus 101 may be configured to provide signalling that represents the virtual spaces and their component visual imagery for presentation by the VR apparatuses 105, 106. Accordingly, in summary, the apparatus 101 may provide for generation and display of the virtual spaces to the users or may control the apparatuses 105, 106 that provide for generation and display of the virtual spaces to the users. It will be appreciated that other ways of distributing the processing required to provide for displaying of the virtual spaces and providing for communication may be provided. For example, the apparatus 101 may be integrated with one or both of the VR apparatuses 105, 106. In summary, the first user and the second user may require apparatus that provides for display of virtual space imagery and a communication link therebetween. The generation of said virtual space imagery, the generation of the context volume and the provision of communication between users may be provided by a centralised or distributed apparatus 101.

The apparatuses 105, 106 may receive signalling indicative of one or both of the user's head orientation and the location of their respective user in a real-world space from a location tracker (not shown). The location tracker may comprise a single device or a plurality of sub devices that perform one or both of the following functions: determine viewing-direction information indicative of the user's head orientation and determine user-location information comprising the user's location in the real world space. The user may have one or more tags or markers on their person, which the tracker may use to determine one or more of their location, body/head orientation or any other positional/movement characteristic it is configured to determine. In other examples, the tracker may use analysis of captured sensor data, such as visual data from a camera, to determine one or more of their location, body/head orientation or any other positional/movement characteristic it is configured to determine. It will be appreciated that such functionality may be provided by a plurality of independent apparatuses that are configured to report to the apparatus 101 or VR apparatus 106, 106 as required. The head orientation may control virtual reality view the user is provided with due to a change in the viewing direction in the virtual space.

The apparatus 101, 105, 106 may receive signalling representative of captured virtual reality content from one or more content capture devices. Accordingly, cameras 109A and 109B may comprise VR content capture devices. The VR content capture device may comprise a Nokia Ozo camera. The capture device may be configured to capture at least visual imagery of a space in which it is located such that a three-dimensional representation of at least part of the real-world space is presentable in virtual reality. The signalling provided by the capture device to the apparatus 101 may comprise depth information of the space it captures and any other information required or desired to create such a virtual three-dimensional representation.

Example FIGS. 2 to 8 show one or two users present in their real-world space in an upper half of each figure and a representation of the one or two users in one or more virtual spaces in a lower half of each figure. The virtual spaces may comprise virtual reality spaces one or more of the users are experiencing.

Figure 2:
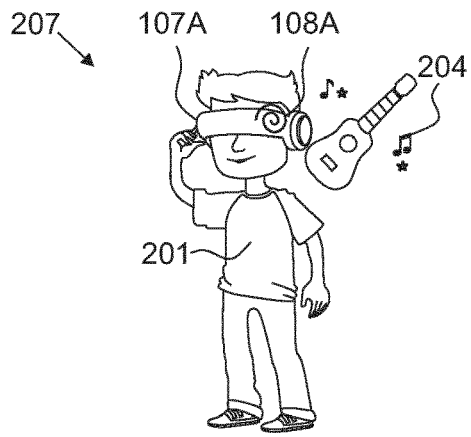
FIG. 2 shows a first user and a representation of the first user active in a first virtual space and the presentation of a passive representation of the first user in a second virtual space.
Figure 2:
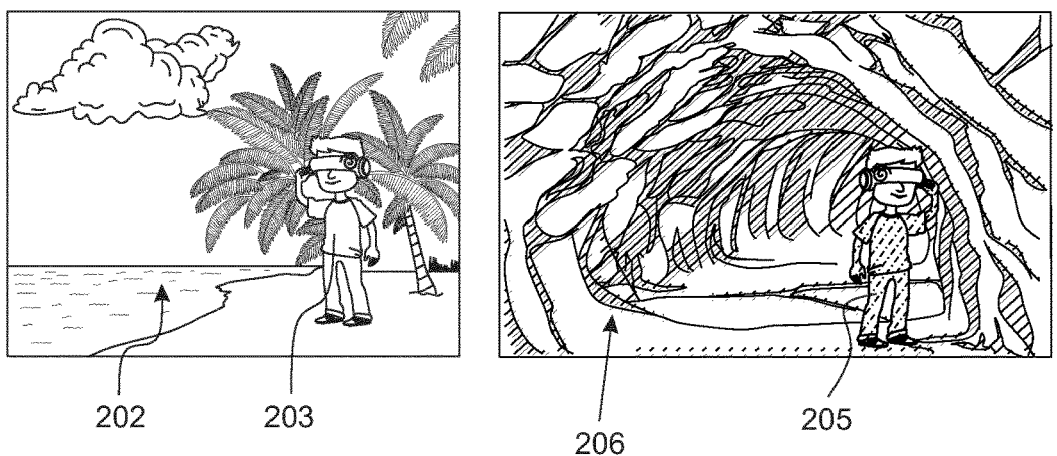

FIG. 2 shows a first user 201 wearing the VR headset 107A of apparatus 105 along with headphones 108A. The first user 201 is provided with a view of a first virtual space 202 comprising a beach scene, by the VR apparatus 105. The first user 201 may also be audibly presented with ukulele music as part of the experience of the VR space by headphones 108A. The music is represented by icon 204. There may be presented a first representation 203 of the first user 201 provided for display in the first virtual space 202. The first representation 203 may comprise imagery of the first user 201, a 3-D model of the first user 201, an avatar or any other representation that other users, who may be associated with the first user 201, may uniquely identify as associated with the first user 201. In one or more examples, the first representation 203 may not be provided, such as if the first user 201 is the only person experiencing the first virtual space 202 and therefore there is nobody who needs to see the location of the first user 201 in the first virtual space 202.

The first user 201 may be associated with one or more other users, such as friends of the first user 201. The first user 201 may provide input to the apparatus 101 or input which the apparatus 101 can subsequently access to indicate other users who the first user 201 has accepted as potential senders of messages to them.

Figure 3:
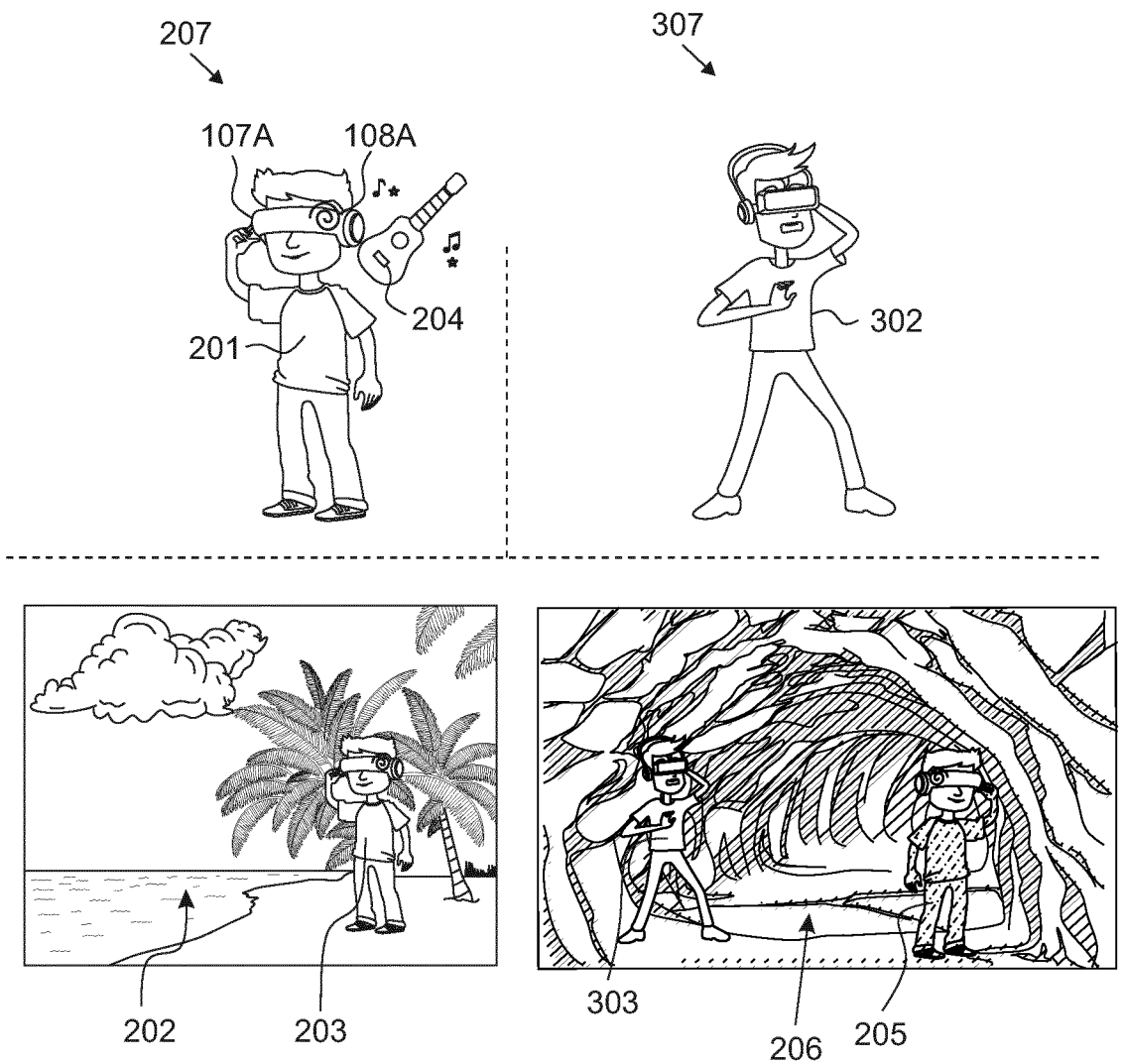
FIG. 3 is similar to FIG. 2 and additionally shows a second user and a representation of the second user active in the second virtual space.

Accordingly, the apparatus 101 may be provided with user-connection information indicative of a predetermined link between the first user 201 and one or more other users, such as the second user 302, shown in FIG. 3.

A further representation of the first user 201 may be provided for presentation in other virtual spaces, such as virtual spaces that are currently being experienced by other users who appear in the user-connection information. Thus, a second representation 205 of the first user 201 may be presented a second virtual space 206. The second virtual space 206, in this example, comprises a cave scene. It will be seen in FIG. 3 that the second user 302 is presented with the second virtual space 206 having the second representation 205 therein. The second representation 205 may comprise imagery of the first user 201, a 3-D model of the first user 201, an avatar or any other representation that the second user 302, or other user associated with the first user 201, may uniquely identify as being associated with the first user 201.

In one or more examples, the second representation 205 may differ from the first representation 203.

For example, the first representation 203 may be an active representation in that the representation 203 is located at the virtual location in the first virtual space that the first user 201 is currently presented with and therefore experiencing. Thus, the first representation 203 may move with movement of the first user in the virtual space. Accordingly, the first representation 203 may be representative of the first user 201 and representative of the first user's location in the first virtual space 203.

The second representation 205 may be a passive representation of the first user 201. As mentioned above, the first user 201 is presented with the first virtual space 203 and not the second virtual space 206. Accordingly, the second representation 205 may be representative of the first user 201 but not of the first user's location in the second virtual space, because the first user 201 is not experiencing the second virtual space 206. Thus, the second representation 205 may not move with movement of the first user in their real-world space 207, if such movement happens to be configured to provide the input for movement in virtual spaces (other user movement interfaces may be provided). To summarise, in one or more examples, prior to a communication initiation input the presentation of the representation 205 of the first user in the second virtual space 206 is absent of visual imagery of the first virtual space 206 and may be displayed irrespective of the virtual space the first user is currently experiencing.

Turning to example FIG. 3, which is similar to FIG. 2, the second user 302 is shown experiencing the second virtual space 206 in their real-world space 307. The second user 302 may move around the second virtual space to view its contents. A representation 303 of the second user 302 may be provided for display in the second virtual space 206. The second representation 205 of the first user 201 may be viewable in the imagery of the virtual space 206 provided for viewing by said second user 302. In this example, the second representation 205 is shown with a visual effect, such as a striped effect or partial transparency effect, to illustrate to the second user 302 that the representation 205 is a passive representation. A passive representation may, in one or more example, be considered to comprise a representation of a user 203 in the space 206 who is not exploring the space 206. In one or more examples, the passive representation may be stationary in the virtual space 206. In one or more examples, the passive representation may be positioned nearby the second user 303 in the virtual space 206 and, at least one time, repositioned to be nearby the second user 302 in the virtual space 206 based on movement of the second user 302, so the second user 302 may easily find the second representation 205. In one or more examples, movement of the user 201 or user input of the first user 201 to move in virtual space 202 does not provide for movement of the second, passive, representation 205.

In the situation shown in FIG. 3, which illustrates the situation prior to a communication initiation input, the apparatus 101 or the apparatus 105 provides for presentation to the first user 201 of the first virtual space 202 and not the second virtual space. Likewise, the apparatus 101 or apparatus 106 provide for presentation to the second user 302 of the second virtual space 206 and not the first virtual space 202. Thus, while the second user 302 may be presented with the second representation 205 of the first user 201 they are not presented, visually nor audibly, with content of the first virtual space 202 that that first user 201 is experiencing.

Figure 4:
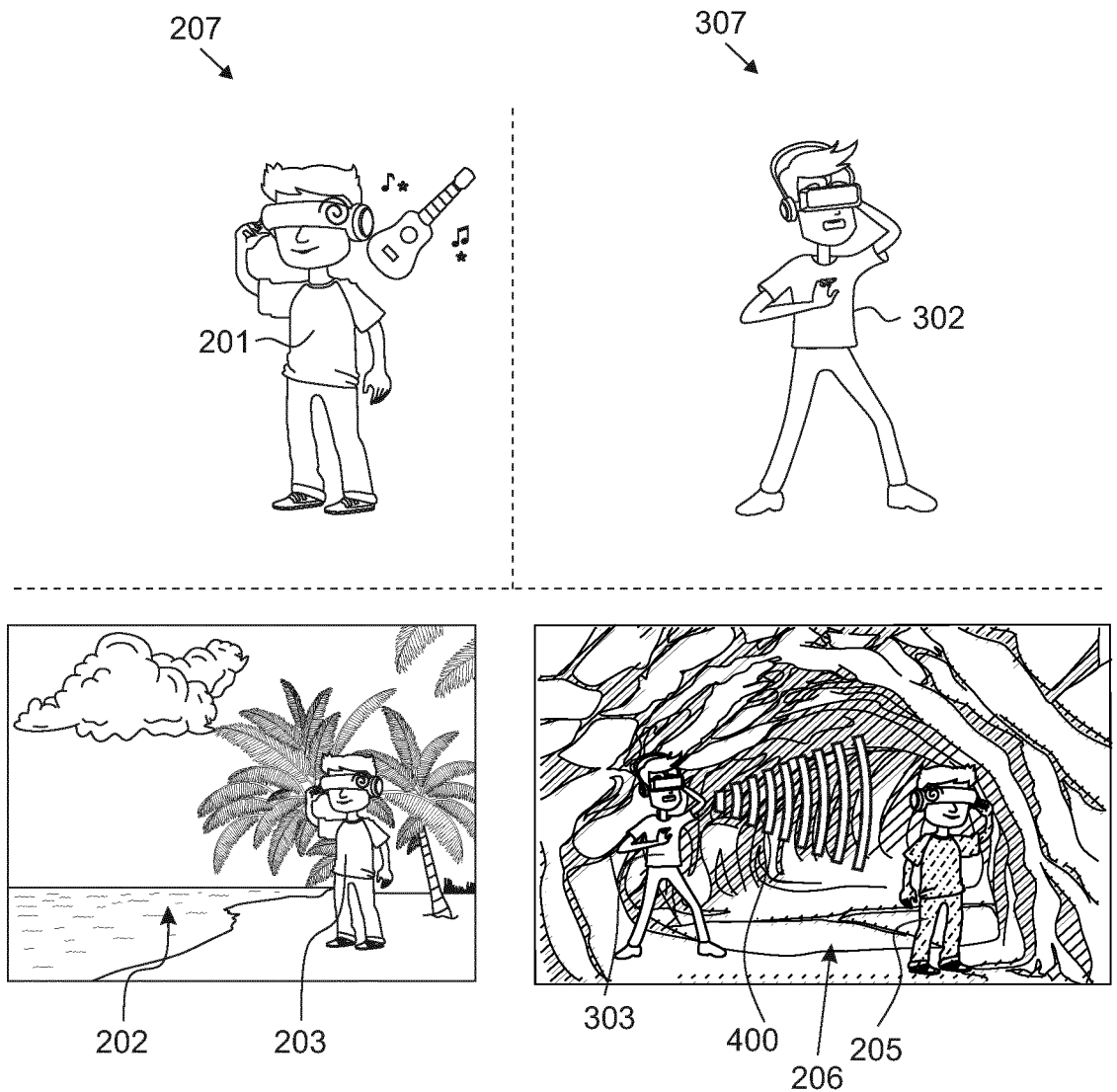
FIG. 4 is similar to FIG. 3 and additionally shows the second user, in the second virtual space, talking towards the passive representation of the first user to provide a communication initiation input.

Example FIG. 4 shows the second user 302, in the second virtual space, providing a communication initiation input 400. The communication initiation input 400, in this example, comprises any second-user-speech that is captured at a time when the second user 302 is presented with a virtual reality view directed towards the representation 205 of the first user 201. Thus, the initiator for communication may comprise the second user talking towards the representation 205 in the second virtual space 206. In one or more examples, the communication initiation input 400 may require the location of the second user 302 in the second virtual space to be within a threshold distance of the representation of the first user 205 as well as the provision of the aforementioned second-user-speech. In one or more examples, the first-user-speech may need to be a codeword or predetermined phrase to initiate communication (perhaps irrespective of the direction they are looking in the virtual space). In some other examples, it is the act of providing the second-user-speech towards the first user's representation 205 that is sufficient to provide the communication initiation input 400. In some other examples, other inputs, such as one or more of eye gaze input, user interface input, performance of a gesture may comprise the communication initiation input 400. The communication initiation input 400 may, in general terms, comprise a user input by the second user, such as by voice, gesture, user interface or others, which may be required to be following a previously provided permission-giving input by the first user indicative of them being agreeable to being contactable.

Figure 5:
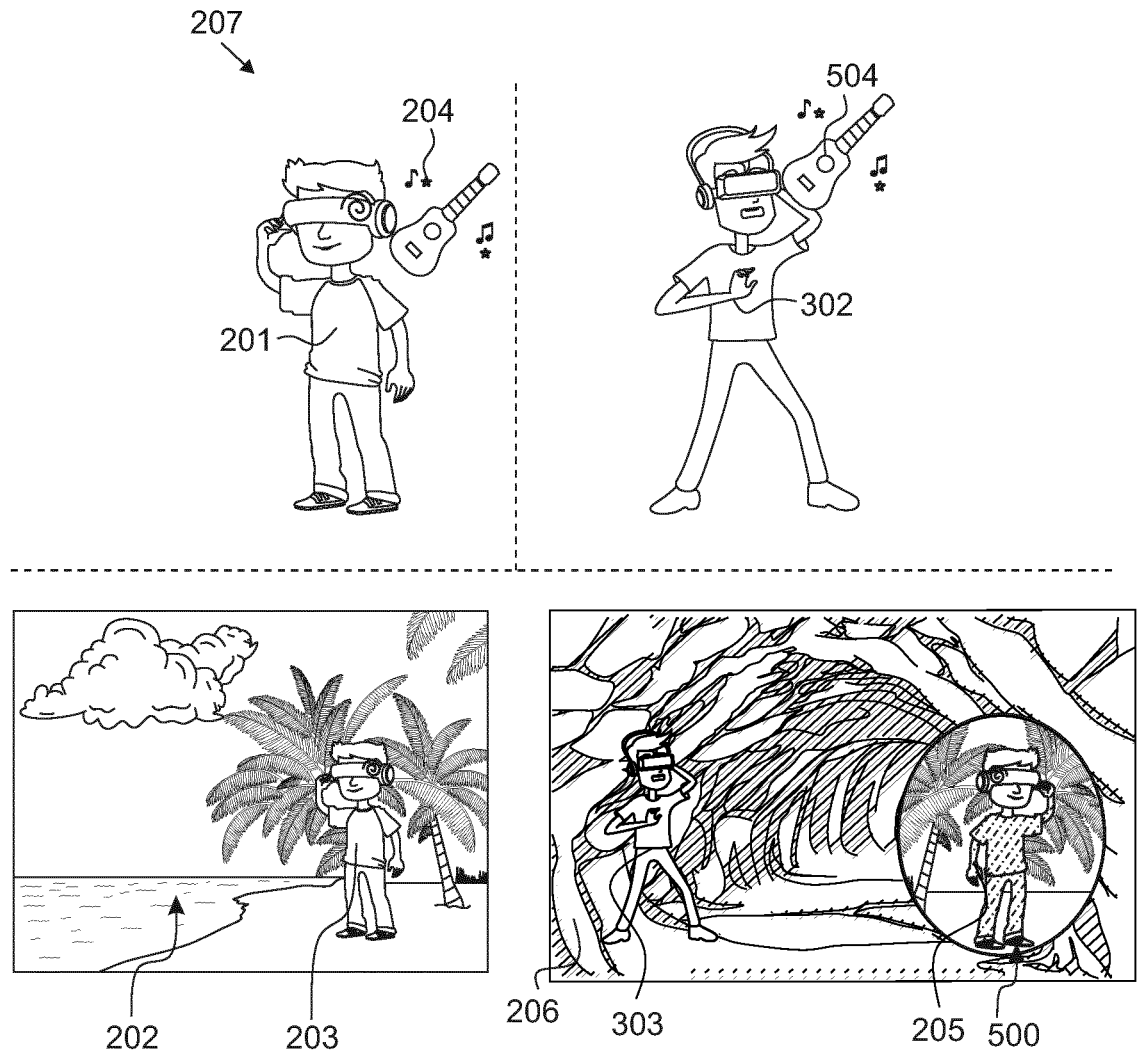
FIG. 5 shows an example context volume that associated with the first user and that is presented to the second user in the second virtual space, the context volume comprising a sub-volume of the first virtual space.

Example FIG. 5 shows the presentation of a context volume 500 in direct response to the provision of the communication initiation input 400. The context-volume 500 comprises a view of part of the volume of the first virtual space 202 that is displayed, superimposed into a sub-volume (e.g. a volume less than the total volume of the second virtual space) of the second virtual space. Thus, the context volume 500 may comprises only a sub-volume of the first virtual space including the corresponding imagery (and audio, for example) from that sub-volume of the first virtual space. The part of the imagery displayed as the context volume may comprise that that surrounds a current virtual point of view location of the first user 201 in the first virtual space. For example, the context volume may comprise the part of the first virtual space 202 that surrounds the first user's representation 203, such as up to a predetermined distance from the first user's representation 203. Accordingly, the second user 302 is provided with a view of the second virtual space 206 wherein a sub-volume comprising part of the volume of the second virtual space is replaced with the sub-volume from the first virtual space 202 that surrounds the current location of the first user's representation 205. The context volume 500 thereby enables the second user 302 to see a part of the first virtual space 202 local to and currently experienced by the first user 203. Accordingly, the second user 302 can understand what the first user 201 is experiencing to understand how effective communication with the first user 201 may be given their activity or perceived level of immersion while experiencing the first virtual space 202.

The first virtual reality content that provides the data for generation of the first virtual space 202 may, as mentioned above, include audio content presented to the first user 201 in the first virtual space 202. Accordingly, the presentation of the context volume 500 may not only comprise visual presentation but also audio presentation. The apparatus 101 may therefore provide for presentation, to the second user 302, of said audio content from the first virtual space 202 as currently presented to the first user in the first virtual space 202. Accordingly, the apparatus enables the second user 302 to hear the audio of the first virtual space currently experienced by the first user. The ukulele music 204 that the first user 201 is listening to in the first virtual space is therefore audible by the second user 302, as illustrated by icon 504.

The apparatus 101 may provide for transfer of, or reference to, the first virtual reality content that provides for generation of the first virtual space 202 along with information indicative of the sub-volume to extract therefrom for display as the context volume 500. In other examples, rather than the sub-volume, the information may define the location of the first user 201 in the first virtual space 202 and the size of the sub-volume may be determined based on one or more factors by the apparatus 101 or apparatus 106. Said factors may include the size of the second virtual space 206 or the proximity of the second user in the second virtual space 206 to the representation 205 of the first user. The apparatus 106 may then be able to three-dimensionally superimpose the sub-volume of the first space 202 into the second space 206 for display to the second user 302 as the context volume 500. In other examples, the apparatus 101 is caused to generate a view of the second space 206 superimposed with the sub-volume of the first space 202 for presentation to the second user 302 via the apparatus 106. In one or more examples, the context volume 500 comprises a sub-volume of the first space 202 that surrounds the current location of the first user in said first space 202 and therefore at least visual imagery within a predetermined distance of said current location. If the first user 201 moves in the first virtual space while the context volume 500 is presented, the sub-volume of the first virtual space presented as part of the context volume 500 may be periodically or continually updated based on the new current location of the first user.

In one or more examples, the apparatus 100 may provide for at least communication from the second user 302 to the first user 201 by virtue of transmission of the captured second-user-speech, spoken as part of the communication initiation input 400, to the first user 201. The captured second-user-speech may comprise an example of captured communication content from the second user. For example, in one or more examples where the communication is text based the captured communication content may comprise a message.

It will be appreciated that said communication may be provided in various forms. For example, in one or more examples, the at least communication from the second user 302 to the first user 201 comprises one or more of:
  i) audio based communication;
  ii) one-way communication, at least initially, from the second user to the first user, such as until the first user 201 provides a two-way communication input to initiate two-way communication;
  iii) two-way communication, such as audio based, two-way, communication between the first user and the second user;
  v) visualised text based communication such as speech bubbles that are visually presented with a message from one user to another in the virtual spaces 202, 206;
  vi) voice-to-text converted audio, such as second-user-audio, for presentation as text to the first user based on voice input from the first user.

In one or more examples, the captured second-user-speech, spoken as part of the communication initiation input 400 (or other captured communication content from the second user), is provided for presentation immediately to the first user 201 while the second user 302 is presented with the context volume 500. The apparatus 101 thereby provides some context to the second user 302 regarding the experience of the first user 201 so they may thereby understand how their captured communication content will be received by the first user 201.

For example, if the first user 201 is busy experiencing the first virtual space 202, the second user 302, by virtue of the presentation of the context volume 500, may understand why a response from the first user 201 may not be immediately forthcoming.

In one or more examples, the context volume 500 includes presentation of the second representation 205 of the first user 201. In one or more other examples, the context volume 500 includes presentation of the first representation 203 of the first user 205 in the second virtual space 206. The first representation 203, as mentioned above may comprise an "active" representation in that it moves with first user movement.

In one or more other examples, the apparatus 100 may provide for at least communication from the second user 302 to the first user 201 after a period of time. Thus, following the communication initiation input 400, the context volume 500 may be provided and the captured second-user-speech spoken as part of the communication initiation input 400 (or, more generally, other captured communication content) may be queued for transmission to the first user 201. This may enable the second user 302 to decide whether they still wish to communicate with the first user. The apparatus may be configured to wait for the second user 302 to provide a further indication to confirm that communication should occur. The further communication may comprise a user-input or may comprise the absence of a user-input within a predetermined time period. It may be that the second user sees that the first user 201 is busy in the context volume 500 and does not want their captured second-user-speech transmitted to the first user 201 after all. Thus, the apparatus 101 may be caused to provide for said communication following one of: (a) a period of time in which no second-user-cancel input is received indicative of a desire of the second user not to send the queued captured second-user-speech; and (b) a second-user-confirm-send input indicative of a desire of the second user to send the queued captured second-user-speech, which may need to be received with a predetermined period of time.

Figure 6:
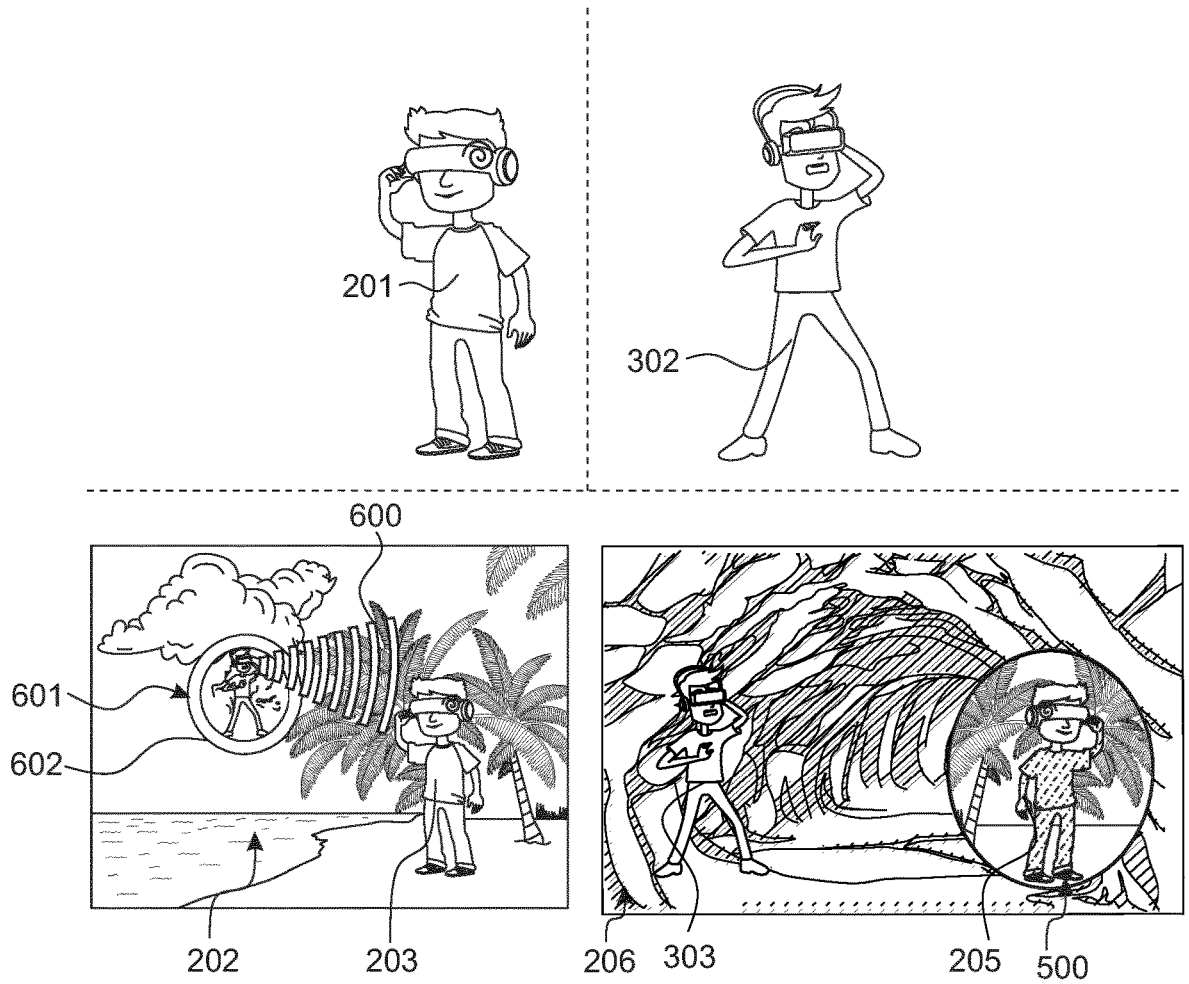
FIG. 6 shows an example presentation to the first user in the first virtual space of audio from the second user and example second-user-imagery displayed in the first virtual space.

Example FIG. 6 is similar to FIG. 5 but shows the first user 201 being presented with the captured communication content from the second user 302 in the first virtual space 202. Accordingly, in this example, the first user 203 is audibly presented with the captured second-user-speech shown as 600.

Accordingly, to summarise the functionality exemplified in the FIGS. 2 to 6, the apparatus 101 was caused to base its action on a first, three-dimensional, virtual space 202 in which visual imagery is presented to a first user 201 and second, three-dimensional, different, virtual space 206 in which visual imagery is presented to a second user 302. The first and second virtual spaces 202, 206 are generated from respective virtual reality content that comprises said visual imagery for display in said respective first and second virtual spaces and, in one or more examples, audio, such as spatial audio and may be data for providing other sensory stimuli. The apparatus 101 provides for a representation 205 of the first user 201, viewable by the second user 302 to be provided in the second virtual space 206. Further, based on a communication initiation input 400 from the second user 302, the apparatus 101 may provide for presentation of the context volume 500. In particular, the apparatus 101 provides for presentation in the second virtual space 206, at a virtual location based on a location of the second representation 205 of the first user 201 in the second virtual space 206, of the context-volume 500. Accordingly, to the second user 302, in one or more examples, a limited amount of visual imagery of the first virtual space experienced by the first user may appear around the second representation 303 of the first user 201 in the second virtual space 206.

Returning to example FIG. 6, the apparatus 101 is further caused to provide for display of second-user-imagery 601 representative of the second user 302, in the first virtual space 202 for presentation to the first user 201. The second-user-imagery 601 may comprise, as shown in this example, a two-dimensional representation of the second user 303 in a window 602. The window 602 may provide for viewing of the representation 303 of the second user in the second virtual space or may show an avatar. In one or more other examples, the second-user-imagery 601 may comprise a sub-volume of the second virtual space, similar to the context volume 500. Further, in one or more examples, the second-user-imagery 601 may include a view in the second virtual space and may comprises imagery from a point of view defined by the location of said representation 203.

It will be appreciated that the first user 201 may be presented with one or more sounds from the first virtual reality content, which may make it difficult to understand that the second-user-speech 600 is not part of the first virtual reality content. Accordingly, in one or more examples, the apparatus 101 may be caused to provide for application of a predetermined audio effect to the second-user-audio of the second user that is presented to the first user. The audio effect may comprise a tunnel effect to replicate the audio being heard through a tunnel (e.g. a tunnel from the second virtual space 206). The audio effect may be configured to be distinctive over audio of the first virtual space 202. The audio effect may thereby indicate to the first user 201 that said second-user-audio originates from a different virtual space to the first virtual space 202.

Figure 7:
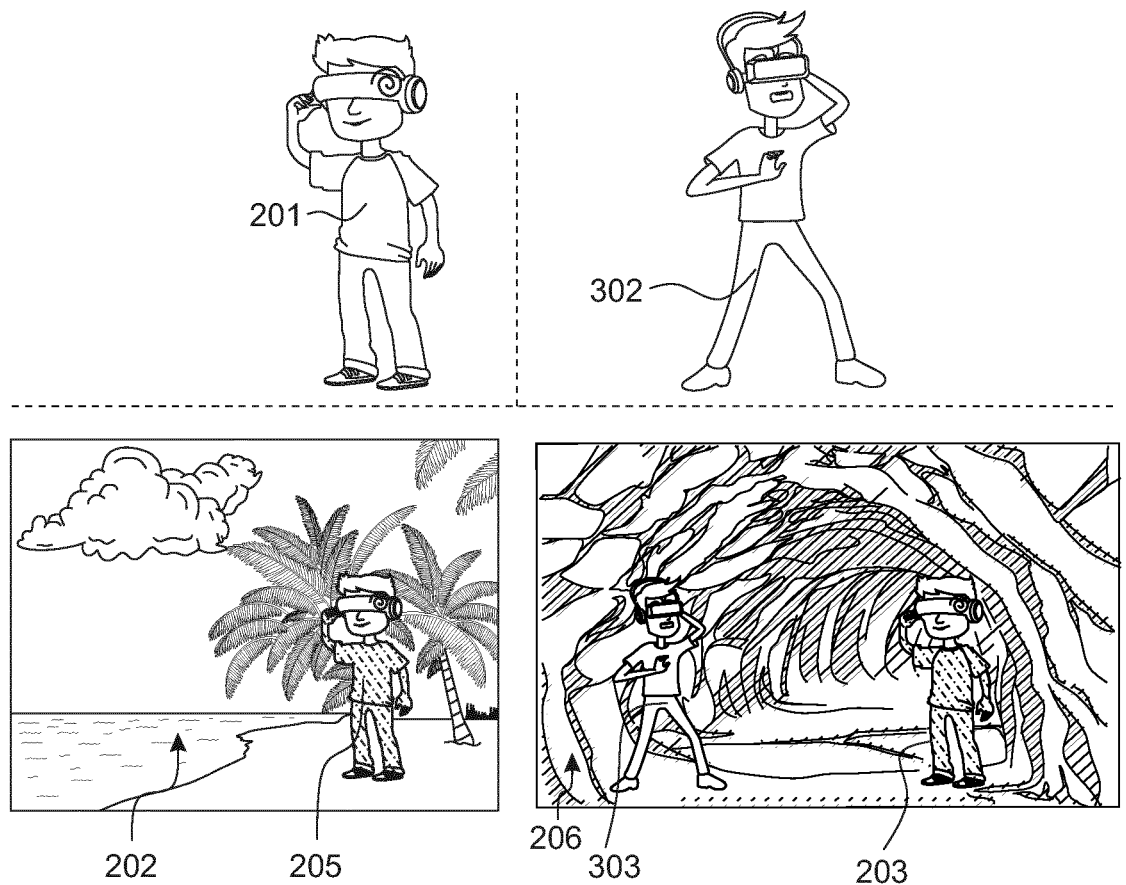
FIG. 7 shows the presentation of the second virtual space to the first user following the first user having provided first user input.

Example FIG. 7 shows the first user 201 having decided to join the second user 302 in the second virtual space 206. Accordingly, the apparatus 101 may provide for display to the first user 201 via the first apparatus 105 of a view in the second virtual reality space 206 to replace the first user's view of the first virtual space 202. Accordingly, an active representation 203 of the first user is shown in the second virtual space 206. In one or more examples, the passive representation 205 of the first user 201 may be provided for presentation in the first virtual space. The provision of the representation 205 in the first virtual space 202 may allow for other users who are exploring the first virtual space 202 to contact the first user 201, who is now in the second virtual space 206.

The switching of the view of the first user 201 from one that is in the first virtual space 202 to one that is in the second virtual space 206 may be made based on first user input directed towards the second-user-imagery 601. The placement of the first user and the second user in the common, second virtual space 206 may provide for effective communication between the first user 201 and the second user 302.

In this example, the first user 201, following provision of the first user input to switch to the second virtual space 206, is provided with a first-user location in the second virtual space 206 based on the location of the second representation 203. Accordingly, the apparatus 101 provides for presentation of view to the first user from said first-user location in the second virtual space 206.

While in the above example, from the point of view of the first user, the apparatus 101 provides for presentation of the second-user-imagery 601 because the second user provided the communication initiation input 400, the first user may receive communication requests from a plurality of users who may also have provided the communication initiation input 400. The user-connection information may identify a plurality of users, such as third, fourth and so on users who are also exploring virtual spaces and may wish to communicate with the first user 201.

Accordingly, rather than the second-user-imagery 601, the apparatus 101 may provide for display of a carousel comprising a plurality of virtual-space-graphics, each virtual-space-graphic at least representative of a virtual space in which other users, including the second user 302, who are connected to the first user are present, wherein the user-connection information provides an indication of a predetermined link between the first user and said other users. Accordingly, the apparatus 101 may provide for communication with one or more of the second user and other users based on a selection input by the first user of one or more of the plurality of virtual-space-graphics.

Figure 8:
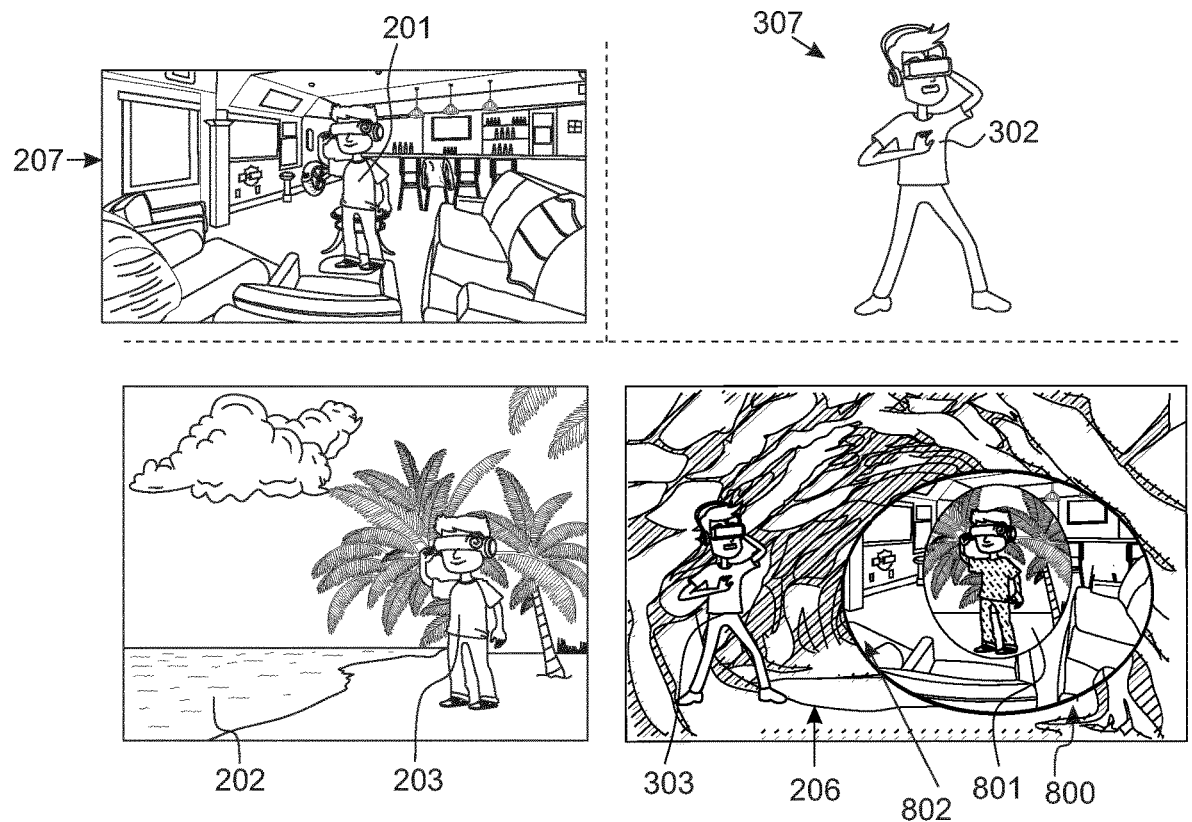
FIG. 8 shows an example real-world space in which the first user is located while experiencing the first virtual space and a second example context volume comprising a sub-volume of the first virtual space as well as imagery from the first user's real-world space.

Example FIG. 8 shows a second example of the context volume 800. In FIG. 8, the real-world space 207 in which the first user is located at the time of experiencing said first virtual space is shown in more detail. In this example, the context volume not only includes a sub-volume of the first virtual space 202 currently being experienced by the first user but also imagery from the real-world space 207.

Accordingly, in one or more examples, the apparatus 101 is caused to provide a context volume 800 further comprises visual imagery of the physical location 207 in which the first user 201 is present while being presented with said first virtual space 202 based on live-captured camera imagery, such as from camera 109A. The apparatus 101 may provide for the sub-volume from the first virtual space 202 and the live-captured camera imagery from camera 109A to be combined in different ways to form the context volume 800. In this example, the context volume 800 comprises a core section 801 comprising said sub-volume of the first virtual space 202 at least partly surrounding the first user as located in the first virtual space, and an outer layer section 802, outward of said core section 801, comprising said visual imagery of the physical, real-world location 207 in which the first user 201 is present.

In one or more examples, the camera imagery that forms the context volume 800 may not be live-captured. For example, the camera imagery may be pre-captured imagery of the same room the user is currently in.

By providing a context volume 800 that includes imagery (and optionally audio) from both the real-world space 207 and the first virtual space 202 in which the first user 201 is present and virtually present respectively may provide the second user 302 with a more effective way to communicate with the first user given they will understand the setting and virtual experience of the first user 201.

FIG. 9 shows a flow diagram illustrating the steps of, based on 901 a first virtual space in which visual imagery is provided for presentation to a first user and a second, different, virtual space in which visual imagery is provided for presentation to a second user, the first and second virtual spaces based on respective first and second virtual reality content that comprises visual imagery displayed in said respective first and second virtual spaces and wherein a representation of the first user is provided in the second virtual space and based on a communication initiation input;
  providing for presentation 902, in the second virtual space, at a virtual location based on a location of the representation of the first user in the second virtual space, of a context-volume comprising a sub-volume of the first virtual space at least partly surrounding the first user to enable the second user to see the first virtual space currently provided for consumption by the first user, and provide for at least communication from the second user to the first user.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   determine a first virtual space for presentation to a first user, wherein the first virtual space includes first virtual reality content which comprises visual imagery displayed in the first virtual space;
   determine a second virtual space for presentation to a second user, wherein the second virtual space includes second virtual reality content which comprises visual imagery displayed in the second virtual space and the second virtual reality content is different than the first virtual reality content;
   provide a representation of the first user in the second virtual space;
   based at least in part on communication initiation input, provide for presentation, in the second virtual space, at a virtual location based on a location of the representation of the first user in the second virtual space, of a context-volume comprising a sub-volume of the first virtual space at least partly surrounding the first user to enable the second user to see at least a portion of the first virtual space currently provided for consumption by the first user; and
   provide for at least communication from the second user to the first user.

2. The apparatus of claim 1, wherein the first virtual reality content includes audio content for presentation in the first virtual space to enable the second user to hear the audio presented in the first virtual space.

3. The apparatus of claim 1, wherein the communication initiation input comprises one or more of:
   a user input by the second user;
   a user input by the second user following a permission-giving input by the first user indicative of them being contactable;
   a voice command directed in a direction within a threshold of the representation of the first user; or
   a user input by the first user.

4. The apparatus of claim 1, wherein the apparatus is further caused to provide for display of a second-user-imagery representative of the second user, in the first virtual space for viewing by the first user, the second-user-imagery comprising one or more of:
   a representation of the second user;
   a window displayed in the first virtual space to provide for viewing of a representation of the second user in the second virtual space;
   one of a plurality of virtual-space-graphics, each virtual-space-graphic at least representative of a virtual space in which other users, including the second user, who are connected to the first user are active, wherein user-connection information provides an indication of a predetermined link between the first user and said other users; or
   other visual imagery representative of the second user.

5. The apparatus of claim 4, wherein based on first user input directed to the second-user-imagery, provide for replacing presentation of the first virtual space intended for viewing by the first user with presentation of the second virtual space intended for viewing by the first user to enable communication between the first user and the second user in a common virtual space.

6. The apparatus of claim 5, wherein the first user is provided with a first-user location in the second virtual space and wherein the presentation of the second virtual space intended for viewing by the first user comprises providing for presentation of a view of the second virtual space from a point of view of the first-user-location, the first-user-location based on a location of the representation of the first user in the second virtual space.

7. The apparatus of claim 1, wherein the apparatus is caused to provide for application of a predetermined audio effect to the audio captured of the second user that is provided for presentation to the first user to thereby indicate that said audio originates from a different virtual space to the first virtual space.

8. The apparatus of claim 1, wherein the context volume further comprises visual imagery of a physical location in which the first user is present while being presented with said first virtual space based on live-captured camera imagery of the physical location.

9. The apparatus of claim 8, wherein the context volume comprises a core section comprising said sub-volume of the first virtual space that is provided for display to at least partly surround the first user, and an outer layer section, outward of said core section, comprising said visual imagery of the physical, real-world location in which the first user is present.

10. The apparatus of claim 1, wherein the provision of the representation of the first user, intended for viewing by the second user, that is provided in the second virtual space is dependent on user-connection information indicative of a predetermined link between the first user and the second user.

11. The apparatus of claim 1, wherein a first representation of the first user is provided in the first virtual space and said representation of the first user in the second virtual space comprises a second representation of the first user in the second virtual space, wherein the first representation is representative of the first user and their location in the first virtual space while the second representation is representative of the first user and their absence in the second virtual space.

12. The apparatus of claim 1, wherein the sub-volume of the first virtual space comprises visual imagery from within a predetermined distance of a virtual location at which the first user is located in the first virtual space.

13. The apparatus of claim 1, wherein based on captured communication content from the second user, the communication content provided as one of part of the communication initiation input from the second user or subsequent to said communication initiation input;
Provide for said communication from the second user to the first user of said captured communication content subsequent to said presentation of the context-volume and based on a further indication from the second user.

14. A method, the method comprising:
determining a first virtual space for presentation to a first user, wherein the first virtual space includes first virtual reality content which comprises visual imagery displayed in the first virtual space;
determining a second virtual space for presentation to a second user, wherein the second virtual space includes second virtual reality content which comprises visual imagery displayed in the second virtual space and the second virtual reality content is different than the first virtual reality content;
providing a representation of the first user in the second virtual space;
based at least in part on communication initiation input, providing for presentation in the second virtual space, at a virtual location based on a location of the representation of the first user in the second virtual space, a context-volume comprising a sub-volume of the first virtual space at least partly surrounding the first user to enable the second user to see at least a portion of the first virtual space currently provided for consumption by the first user; and
provide for at least communication from the second user to the first user.

15. The method of claim 14, wherein the first virtual reality content includes audio content for presentation in the first virtual space and wherein the presentation of the context-volume includes presentation of said audio content provided for presentation in the first virtual space to enable the second user to hear the audio presented in the first virtual space.

16. The method of claim 14, wherein the communication initiation input comprises one or more of:
a user input by the second user;
a user input by the second user following a permission-giving input by the first user indicative of them being contactable;
a voice command directed in a direction within a threshold of the representation of the first user; or
a user input by the first user.

17. The method of claim 14, further comprising providing for display of second-user-imagery representative of the second user, in the first virtual space for viewing by the first user, the second-user-imagery comprising one or more of:
a representation of the second user;
a window displayed in the first virtual space to provide for viewing of a representation of the second user in the second virtual space;
one of a plurality of virtual-space-graphics, each virtual-space-graphic at least representative of a virtual space in which other users, including the second user, who are connected to the first user are active, wherein user-connection information provides an indication of a predetermined link between the first user and said other users; or
other visual imagery representative of the second user.

18. The method of claim 17, wherein based on first user input directed to the second-user-imagery, provide for replacing presentation of the first virtual space intended for viewing by the first user with presentation of the second virtual space intended for viewing by the first user to enable communication between the first user and the second user in a common virtual space.

19. The method of claim 18, wherein the first user is provided with a first-user location in the second virtual space and wherein the presentation of the second virtual space intended for viewing by the first user comprises providing for presentation of a view of the second virtual space from a point of view of the first-user-location, the first-user-location based on a location of the representation of the first user in the second virtual space.

20. A non-transitory computer readable medium comprising program instructions stored thereon for performing at least the following:
determining a first virtual space for presentation to a first user, wherein the first virtual space includes first virtual reality content which comprises visual imagery displayed in the first virtual space;
determining a second virtual space for presentation to a second user, wherein the second virtual space includes second virtual reality content which comprises visual imagery displayed in the second virtual space and the second virtual reality content is different than the first virtual reality content;
providing a representation of the first user in the second virtual space;
based at least in part on communication initiation input, providing for presentation in the second virtual space, at a virtual location based on a location of the representation of the first user in the second virtual space, a context-volume comprising a sub-volume of the first virtual space at least partly surrounding the first user to enable the second user to see at least a portion of the first virtual space currently provided for consumption by the first user; and
provide for at least communication from the second user to the first user.

* * * * *

UNITED STATES PATENT AND TRADEMARK OFFICE
CERTIFICATE OF CORRECTION

PATENT NO. : 11,416,201 B2
APPLICATION NO. : 16/765079
DATED : August 16, 2022
INVENTOR(S) : Jussi Leppänen et al.

It is certified that error appears in the above-identified patent and that said Letters Patent is hereby corrected as shown below:

In the Claims

In Column 20, Claim 2, Line 5, delete "space to" and insert -- space and wherein the presentation of the context-volume includes presentation of said audio content provided for presentation in the first virtual space to --, therefor.

In Column 21, Claim 13, Line 23, delete "Provide" and insert -- provide --, therefor.

Signed and Sealed this
Twenty-sixth Day of December, 2023

Katherine Kelly Vidal
Director of the United States Patent and Trademark Office